(12) United States Patent
Kong et al.

(10) Patent No.: US 10,205,172 B2
(45) Date of Patent: Feb. 12, 2019

(54) ELECTRODE FOR LITHIUM SECONDARY BATTERY, MANUFACTURING METHOD THEREOF, AND LITHIUM SECONDARY BATTERY INCLUDING THE SAME

(71) Applicant: Hyundai Motor Company, Seoul (KR)

(72) Inventors: Shin Kook Kong, Seoul (KR); Sang Mok Park, Gyeonggi-do (KR); Sung Hoon Lim, Gyeonggi-do (KR); Sang Heon Lee, Gyeonggi-do (KR); Dong Hui Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/352,962

(22) Filed: Nov. 16, 2016

(65) Prior Publication Data

US 2018/0034060 A1 Feb. 1, 2018

(30) Foreign Application Priority Data

Jul. 27, 2016 (KR) .................. 10-2016-0095507

(51) Int. Cl.
| | | |
|---|---|---|
| *H01M 4/80* | (2006.01) | |
| *H01M 4/134* | (2010.01) | |
| *H01M 4/1395* | (2010.01) | |
| *H01M 4/38* | (2006.01) | |
| *H01M 4/66* | (2006.01) | |
| *H01M 10/0525* | (2010.01) | |
| *H01M 4/74* | (2006.01) | |
| *H01M 10/052* | (2010.01) | |

(52) U.S. Cl.
CPC ............. *H01M 4/80* (2013.01); *H01M 4/134* (2013.01); *H01M 4/1395* (2013.01); *H01M 4/382* (2013.01); *H01M 4/661* (2013.01); *H01M 4/662* (2013.01); *H01M 4/74* (2013.01); *H01M 10/052* (2013.01); *H01M 10/0525* (2013.01)

(58) Field of Classification Search
None
See application file for complete search history.

(56) References Cited

U.S. PATENT DOCUMENTS

2005/0130043 A1   6/2005 Gao et al.

FOREIGN PATENT DOCUMENTS

| JP | 57-170461 A | 10/1982 |
|---|---|---|
| JP | 2008-016329 A | 1/2008 |
| KR | 2003-0016122 A | 2/2003 |
| KR | 2006-0056969 A | 5/2006 |
| KR | 2015-0043247 A | 4/2015 |
| KR | 2016-0041524 A | 4/2016 |

*Primary Examiner* — Wyatt P McConnell
(74) *Attorney, Agent, or Firm* — Mintz Levin Cohn Ferris Glovsky and Popeo, P.C.; Peter F. Corless

(57) ABSTRACT

Disclosed are an electrode for a lithium secondary battery, a manufacturing method thereof, and a lithium secondary battery including the same. The electrode for a lithium secondary battery includes a lithium metal matrix layer, and a support that is formed in a net-shape and impregnated into the lithium metal matrix layer.

6 Claims, 1 Drawing Sheet

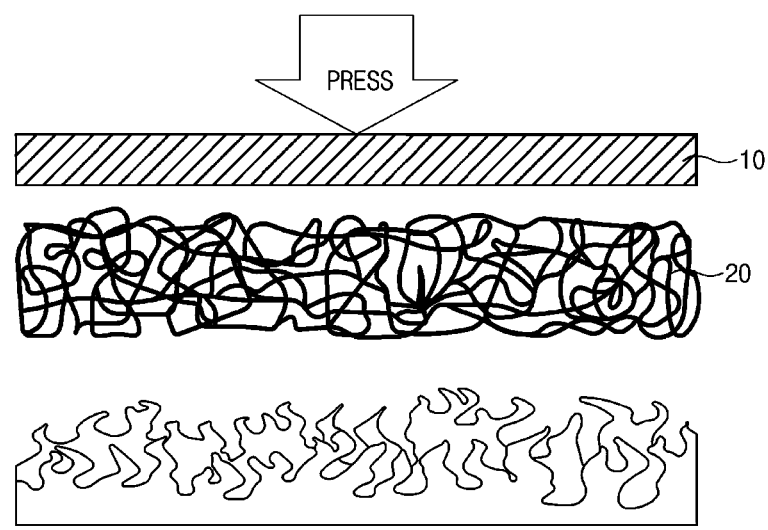

ELECTRODE FOR LITHIUM SECONDARY BATTERY, MANUFACTURING METHOD THEREOF, AND LITHIUM SECONDARY BATTERY INCLUDING THE SAME

CROSS-REFERENCE TO RELATED APPLICATION

This application is based on and claims the benefit of priority to Korean Patent Application No. 10-2016-0095507, filed on Jul. 27, 2016, in the Korean Intellectual Property Office, the disclosure of which is incorporated herein in its entirety by reference.

TECHNICAL FIELD

The present invention relates to an electrode for a lithium secondary battery, a manufacturing method thereof, and a lithium secondary battery including the electrode.

BACKGROUND

Recently, as air pollution problems have been aggravated, research into development of alternative energy has been actively conducted to find a solution in terms of the protection of environment. Battery systems have been developed as development of alternative energy, for example, characteristics of lithium secondary batteries has been improved.

Negative electrodes of lithium secondary batteries have been manufactured largely with graphite, but low ion capacity of about 372 mAh/g per weight (gram) has been a limitation in improving characteristics of lithium secondary batteries. Thus, research has recently continued to manufacture negative electrodes with silicon having ion capacity of about 4,000 mAh/g and lithium metal having ion capacity of about 3,860 mAh/g.

Manufacturing a negative electrode with lithium metal may implement high capacity lithium secondary batteries, but non-uniform desorption/adsorption of lithium in a process in which lithium secondary batteries are repeatedly charged and discharged may lead to formation of lithium having an acicular structure (dendrite) on a surface of the negative electrode. When lithium having the acicular structure continues to grow, it may penetrate through a separator within a battery to reach a positive electrode to cause internal short, battery explosion, and the like.

In order to solve the above-mentioned problem in the related arts, various attempts have been made to restrain formation of lithium having an acicular structure by increasing a surface area of a negative electrode formed of lithium metal but not reached a satisfactory level yet.

SUMMARY

The present invention has been made to solve the above-mentioned problems occurring in the prior art while advantages achieved by the prior art are maintained intact.

In one aspect of the present invention, provided is an electrode for a lithium secondary battery, capable of enhancing characteristics of a lithium secondary battery.

In another aspect of the present invention, provided is a method for manufacturing the aforementioned electrode for a lithium secondary battery.

In another aspect of the present invention, provided is a lithium secondary battery including the aforementioned electrode for a lithium secondary battery.

According to an exemplary embodiment of the present invention, an electrode for a lithium secondary battery includes: a layer comprising lithium metal; and a support. The support may have a porosity ranging from about 90% to about 98%.

A preferred layer may comprise the lithium metal as a main component, which may constitute greater than about 50 wt %, greater than about 60 wt %, greater than about 70 wt %, greater than about 80 wt % or greater than about 90 wt % of the total weight of the layer.

The support may be at least associated, or alternatively, in conjunction with the layer comprising the lithium metal. For example, the lithium metal layer may be overcoated, stacked, connected or bonded on the support. Preferably, the support may be impregnated into the layer comprising the lithium metal.

The term "impregnated" as used herein refers to being embedded at least in portion or entirely in a matrix material as being associated or in conjunction. For instance, a preferred impregnated support in the present invention may be partially or entirely embedded into a layer comprising lithium metal, or at least associated with the layer comprising lithium metal through inner and outer surfaces of the support.

Preferably, the support may be formed in a net shape.

The term "net shape" or "net" as used herein refers to a structure formed of a plurality of strands, and each of the strands may be parallel to each other and/or cross or weave to each other, particularly not limited in angles and directions between those strands. Alternatively, the "net shape" or a "net" structure may be formed of a single strands, which may be tangled or arranged regularly or irregularly and formed in a planar sheet. The net may also include vacant spaces formed between the strands thereof or between arranges of the single strand, which may not be particularly limited in shape or sizes, and the vacant spaces may include pores, channels, labyrinth, and the like. Fact strand of the net may have cross sections of circular or non-circular shape, however, size of the cross sections are much less than lengths of the strands. The strands may be made of various materials, such as fibers such as natural fibers or synthetic polymers, metal strips or wires, and the like, but examples thereof may not be particularly limited. A preferred net shape may be a crosshatching with two or more sets of parallel strands, mesh-like pattern, regularly or irregularly weaved pattern, random entanglements and the like. A density of the support suitably may range from about 0.15 g/cm$^2$ to about 0.45 g/cm$^2$.

A number of pores of the support suitably may range from about 5 ppi to about 120 ppi.

A thickness of the support suitably may range from about 0.1 mm to about 30 mm.

Preferably, the support may include one or more selected from the group consisting of copper, nickel, and stainless steel.

According to another exemplary embodiment of the present invention, a method for manufacturing an electrode for a lithium secondary battery may include: placing a lithium metal foil on a support; heat-treating the lithium metal foil in the presence of an inert gas; and cooling after the heat treatment to form a lithium metal matrix layer impregnated with the support.

A porosity of the support suitably may range from about 90% to about 98%.

A density of the support suitably may range from about 0.15 g/cm$^2$ to about 0.45 g/cm$^2$.

A number of pores of the support suitably may range from about 5 ppi to about 120 ppi.

A thickness of the support suitably may range from about 0.1 mm to about 30 mm.

Preferably, the support may include one or more selected from the group consisting of copper, nickel, and stainless steel.

The inert gas suitably may be one or more selected from the group consisting of helium, argon, and nitrogen.

The method may further comprise pressing the lithium metal foil during the heat-treating the lithium metal foil.

Further provided is a lithium secondary battery comprising a positive electrode; a negative electrode; and an electrolyte, and in particular, the negative electrode may comprise the electrode as described herein.

Still further provided is a vehicle that may comprise the electrode as described herein.

According to another exemplary embodiment of the present invention, a lithium secondary battery includes: a positive electrode; a negative electrode; and an electrolyte, wherein the negative electrode comprises the aforementioned electrode.

BRIEF DESCRIPTION OF THE DRAWINGS

The above and other objects, features and advantages of the present invention will be more apparent from the following detailed description taken in conjunction with the accompanying drawings.

FIG. 1 illustrates an exemplary method for manufacturing an exemplary electrode for an exemplary lithium secondary battery according to an exemplary embodiment of the present invention.

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiment of the present invention will be described.

The present invention relates to an electrode for a lithium secondary battery manufactured using lithium metal. The electrode may include a structure of a net-shaped support, which may be optimally designed to maximize a reaction surface area of lithium metal, unlike a conventional support in a conventional electrode in the related art in which an electrode is manufactured merely using a support with pores. The present invention will be described in detail.

1. Electrode for Lithium Secondary Battery

An electrode for a lithium secondary battery (hereinafter, referred to as an "electrode") according to an exemplary embodiment of the present invention includes a lithium metal matrix layer and a support. In particular, the support may be formed in a net-shape. Thus, the support is referred to as a net-shaped support in the present invention.

The lithium metal matrix layer included in the electrode may be an active material layer comprising a lithium metal.

The net-shaped support included in the electrode of the present invention may be partially or entirely impregnated in the lithium metal matrix layer. The net-shaped support may have a porosity of about 90% to 98%, allowing lithium metal to be evenly or uniformly distributed on a surface thereof or in an interior thereof to maximize a reaction surface area of lithium metal. The porosity refers to a porosity of the net-shaped support before being impregnated into the lithium metal matrix layer. Also, the numerical value of the porosity of the net-shaped support m obtained by a ratio (b/a×100) of a volume (b) of pores (empty space) to the entire volume (a) of the net-shaped support.

In consideration of the reaction surface area of lithium metal and durability of the electrode, the net-shaped support may have density ranging from about 0.15 g/cm$^2$ to about 0.45 g/cm$^2$.

The net-shaped support may have the number of pores ranging from about 5 ppi to about 120 ppi to allow lithium metal to be uniformly distributed.

The net-shaped support may have a thickness ranging from about 0.1 mm to about 30 mm in consideration of durability of the electrode.

The net-shaped support as used herein may serve as a current collector of the electrode, may be formed of a material which does not react to a lithium ion in an action potential of the electrode and does not participate in an oxidation-reduction reaction. In detail, the net-shaped support may be a component of one or more selected from the group consisting of copper, nickel, and stainless steel.

In the electrode of the present invention, the net-shaped support may be designed to have an optimal structure to be impregnated the lithium metal, maximizing a reaction surface area of lithium metal. Thus, application of the electrode to a lithium secondary battery may substantially improve capacity, lifespan, and the like, of the lithium secondary battery. Also, since the lithium metal is present on a surface of the net-shaped support and/or penetrates through an interior thereof, the electrode of the present invention may have substantially improved mechanical strength.

2. Method for Manufacturing Electrode

The present invention provides a method for manufacturing the electrode, which will be described in detail with reference to FIG. 1.

a) Placement of Lithium Metal Foil

A lithium metal foil 10 may be placed on the net-shaped support 20. Here, the net-shaped support may have a porosity ranging from about 90% to about 98%, density ranging from about 0.15 g/cm$^2$ to about 0.45 g/cm$^2$, and the number of pores ranging from about 5 ppi to 120 about ppi, and a thickness ranging from about 0.1 mm to about 30 mm.

Accordingly, the lithium metal may be evenly distributed therein to maximize a reaction surface area of lithium metal.

b) Heat Treatment

The lithium metal foil 10 placed on the net-shaped support 20 may be heat-treated in the presence of an inert gas. Here, heat treatment conditions may not be particularly limited and a temperature for the heat treatment may be about 180° C. or greater to allow the lithium metal foil 10 to be melted. Alternatively, the temperature may be adjusted such that the net-shaped support 20 may not be melted.

The inert gas is not particularly limited; however it may be one or more selected from the group consisting of helium, argon, and nitrogen.

During the heat treatment process, the lithium metal foil 10 may be pressed to allow lithium metal to easily permeate into the net-shaped support 20. The pressure applied to the lithium metal foil 10 may not be particularly limited and may be of about a degree to which the net-shaped support 20 is not deformed.

c) Formation of Lithium Metal Matrix Layer

After the heat treatment, cooling may be performed to form a lithium metal matrix layer with a portion or the entirety of the net-shaped support 20 impregnated therein.

Since an electrode is manufactured through the simple process of placing the lithium metal foil 10 on the net-shaped support 20 designed to have an optimal porosity, number of pores, density, thickness, and the like, and heating and/or pressing the lithium metal foil 10, the electrode in which a reaction surface area of lithium metal is maximized may be easily manufactured.

3. Lithium Secondary Battery

The present invention provides a lithium secondary battery including the electrode. In detail, the lithium secondary battery of the present invention includes a positive electrode, a negative electrode, and an electrolyte, and here, the aforementioned electrode may be applied as the negative electrode.

In the lithium secondary battery of the present invention, since the electrode having lithium metal with maximized reaction surface area is applied to the negative electrode, growth of lithium having an acicular structure formed on a surface of the negative electrode may be minimized in a process of repeating charging and discharging of the lithium secondary battery, thereby providing substantially improved capacity and lifespan.

The positive electrode included in the lithium secondary battery of the present invention is not particularly limited and the positive electrode may be formed of a material known in the art and manufactured through a known manufacturing method. For example, the positive electrode may be manufactured by mixing a positive electrode active material such as $LiCoO_2$, $LiMn_2O_4$, $LiFePO_4$, $Li(Ni_xCo_yMn_z)O_2(x+y+z=1)$, and the like, with a conductive material and a binder to prepare slurry and applying the slurry to a current collector.

The electrolyte included in the lithium secondary battery of the present invention is not particularly limited. For instance, the electrolyte may include an organic solvent such as a propylenerarbonate (PC), ethylenecarbonate (EC), dimethylcarbonate (DMC), diethylcarbonate (DEC), ethylmethylcarboonate (EMC), butylenecarbonate, benzonitrile, acetonitrile, tetrahydrofuran, 2-methyltetrahydrofuran, dioxolan, 4-methyldioxolan, N,N-dimethylformamide, dimethylacetoamide, dimethylsulfoxide, dioxane, 1,2-dimethoxyethane, sulforane, dichloroethane, chlorobenzene, nitrobenzene, diethylcarbonate, methylpropylcarbonate, methylisopropylcarbonate, ethylbutylcarbonate, dipropylcarbonate, diisopropylcarbonate, dibutylcarbonate, diethyleneglycol, or dimethylether, and the like. The electrolyte may include a gal prepared by impregnating a polymer membrane such as polyethyleneoxide, polypropyleneoxide, polyethyleneimine, and the like, in the organic solvent.

In addition, the lithium secondary battery of the present invention may include a polyolefin-based separator such as polyethylene (PE), polypropylene (PP), and the like.

EXAMPLE

Hereinafter, an exemplary embodiment of the present invention will be described in detail. However, the exemplary embodiment is only illustrative and the present invention is not limited thereto.

1) Manufacturing Negative Electrode

A lithium metal foil having a thickness of 0.5 mm was placed on a net-shaped support (of Dongjin Metaltech Co.) having density of 0.42 $g/cm^2$, a thickness of 1 mm, and an area of 250×250 $mm^2$ and heat-treated at 190° C. in the presence of argon. After the heat treatment, the net-shaped support impregnated with the lithium metal foil was cooled at room temperature to manufacture a negative electrode.

2) Manufacturing Positive Electrode $Li(Ni_xCo_yMn_z)O_2(x+y+z=1)$ as a positive electrode active material, polyvinylidenefluoride (PVdF) as a binder, and mixture of carbon black and graphite as conductive materials were mixed in a ratio of 93:3:4 to prepare positive electrode slurry. Thereafter, the prepared positive electrode slurry was applied to an aluminum (Al) foil as a current collector, to manufacture a positive electrode.

3) Manufacturing Lithium Secondary Battery

A coin type lithium secondary battery was manufactured through a method known in the related art using the manufactured negative electrode and positive electrode. For example, a film formed of polyethylene (PE)/polypropylene (PP) was used as a separator, and a $LiPF_6$ 1M solution obtained by dissolving $LiPF_6$ in a mixture solvent of EC/EMC/DEC (a volume ratio of 3:4:3) was used as an electrolyte.

In the present invention, since the electrode including lithium metal is manufactured using the net-shaped support designed to have the optimal porosity, density, number of pores, thickness, and the like, the electrode having lithium metal with a large reaction surface area may be obtained, and the electrode may be applied to provide a lithium secondary battery having characteristics such as high capacity, long lifespan, and the like.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A method for manufacturing an electrode for a lithium secondary battery comprising:
   placing a lithium metal foil on a support;
   heat-treating the lithium metal foil in presence of an inert gas; and
   cooling after the heat treatment to form a lithium metal matrix layer impregnated with the support,
   wherein the support is formed in a net shape,
   wherein a temperature of the heat-treating is 180° C. or greater to allow the lithium metal foil to be melted, wherein a porosity of the support ranges from 90% to 98%, wherein the method further comprises pressing the lithium metal foil during the heat-treating the lithium metal foil to allow the lithium metal to easily permeate into the net-shaped support.

2. The method according to claim 1, wherein a density of the support ranges from about 0.15 g/cm$^2$ to about 0.45 g/cm$^2$.

3. The method according to claim 1, wherein a number of pores of the support ranges from about 5 ppi to about 120 ppi.

4. The method according to claim 1, wherein a thickness of the support ranges from about 0.1 mm to about 30 mm.

5. The method according to claim 1, wherein the support includes one or more selected from the group consisting of copper, nickel, and stainless steel.

6. The method according to claim 1, wherein the inert gas is one or more selected from the group consisting of helium, argon, and nitrogen.

* * * * *